United States Patent [19]

Lecoffre et al.

[11] Patent Number: 4,534,774
[45] Date of Patent: Aug. 13, 1985

[54] METHOD OF DEGASSING A LIQUID

[75] Inventors: Yves Lecoffre, Le Versoud; Jean Marcoz, Grenoble, both of France

[73] Assignee: Societe anonyme dite: Alsthom-Atlantique, Paris, France

[21] Appl. No.: 643,937

[22] Filed: Aug. 24, 1984

[30] Foreign Application Priority Data

Aug. 26, 1983 [FR] France ................. 83 13780

[51] Int. Cl.³ ............................................. B01D 19/00
[52] U.S. Cl. ......................................... 55/44; 55/52; 55/55; 55/189; 55/196
[58] Field of Search ................ 55/40, 41, 44, 52, 55, 55/159, 189, 196

[56] References Cited

U.S. PATENT DOCUMENTS

| | | | |
|---|---|---|---|
| 3,210,912 | 10/1965 | Peake et al. | 55/39 |
| 3,248,855 | 5/1966 | Hartmann | 55/44 |
| 4,087,262 | 5/1978 | Speece | 55/52 |
| 4,180,980 | 1/1980 | Marks et al. | 60/398 |
| 4,398,925 | 8/1983 | Trinh et al. | 55/52 X |

FOREIGN PATENT DOCUMENTS

WOA8302402 7/1983 Int'l Pat. Institute.

OTHER PUBLICATIONS

Soviet Invention Illustrated, Derwent Publications Ltd., Week D39, Nov. 4, 1981, Londres (GB); & SU-A 793 600 (Shleifer).
Soviet Invention Illustrated, Derwent Publications Ltd., Week E33, Sep. 29, 1982, Londres (GB); & SU-A 874 098 (Kiev Eng-Cons Inst.).
Patents Abstracts of Japan, vol. 6, No. 40(C-94) (918), Mar. 12, 1982, & JP-A-56 158 104 (Sasakura Kikai Seisakusho K.K.).
Patents Abstracts of Japan, vol. 6, No. 220(M-169) (1098), Nov. 5, 1982, & JP-A-57 126 506 (Tokyo Shibaura Denki K.K.).

Primary Examiner—Charles Hart
Attorney, Agent, or Firm—Sughrue, Mion, Zinn, Macpeak & Seas

[57] ABSTRACT

The concentration of air in water is rapidly reduced by 80% in a separation enclosure (28) at reduced pressure by virtue of prior injection of microbubbles of air into the enclosure (26). Degassed water is useful for scaling cavitation effects in a hydraulic test tunnel.

3 Claims, 3 Drawing Figures

METHOD OF DEGASSING A LIQUID

The invention relates to a method of degassing a liquid.

BACKGROUND OF THE INVENTION

This method is applicable in general to a liquid containing an unwanted gas in solution and it aims to reduce the concentration of the gas to a final concentration below its initial concentration. More particularly, it may often act to greatly reduce the concentration of air which is naturally dissolved in a mass of water that has been in contact with the atmosphere for a long time. Exchanges of air between the water and the atmosphere will by then have reached equilibrium and the initial concentration is thus the saturation concentration corresponding to atmospheric pressure. It is known that when a liquid capable of dissolving a gas is in contact with a gaseous medium containing the gas, gas exchange takes place continously through the interface between the liquid phase and the gas phase, and the exchange tends continously to approach a concentration of gas in the liquid known as the saturation concentration. It is also known that the saturation concentration is an increasing function of the pressure of the gas in the gaseous medium and that the mass of gas exchanged each second through the interface is proportional to the area thereof.

There may be various reasons for degassing: for example, to limit chemical reactions in which the gas might take part; or to avoid excessively facilitating the formation of pockets of gas in the liquid during subsequent localized reductions of pressure, eg. at the blades of a screw.

A known method of degassing is described in SOVIET INVENTION ILLUSTRATED, Derwent Publications Ltd., Week D39, 4 Nov. 1981, London (GB); and in Soviet patent specification 793 600 (Shleifer A. A., 7 Jan. 1981). This method comprises a mass exchange operation at reduced pressure during which the liquid to be degassed is placed in a free surface separation enclosure. The gaseous medium above the liquid is aspirated to reduce the pressure of the unwanted gas to a degassing value below its saturation pressure which corresponds to the desired final concentration, and this degassing pressure is maintained for the time required to obtain the desired final pressure by mass exchange through the interface between the liquid and the gas phases.

In this known method, the interface between the liquid and the gas phases is increased by injecting bubbles of the unwanted gas into the liquid to be degassed. When this known method is applied to water containing air, and when the bubbles are injected by known methods, the method has the drawback of requiring a length of time which becomes excessive when a large mass of water is to be degassed without excessively increasing the horizontal size of the degassing enclosure. This known method thus appears to be unacceptable on an industrial scale.

Preferred implementations of the present invention obtain high speed degassing at low cost in a degassing enclosure of small horizontal size and of simple construction.

SUMMARY OF THE INVENTION

The present invention provides a method of degassing a liquid, the method being applicable a liquid containing an unwanted gas in solution and serving to reduce the concentration of the gas to a final concentration below its initial concentration, the method comprising a mass exchange operation at reduced pressure during which the liquid to be degassed is placed in a free surface separation enclosure, and the gaseous medium above the liquid is aspirated to reduce the pressure of the unwanted gas to a degassing value below its saturation pressure which corresponds to the desired final concentration, this degassing pressure being maintained for the time required to obtain the desired final pressure by mass exchange through the interface between the liquid and the gas phases, an operation of injecting bubbles of the said unwanted gas itself into the un-degassed liquid thereby increasing the area of the interface between the liquid and gas phases during the reduced pressure exchange operation, thereby accelerating mass exchange, the improvement wherein the said bubbles are microbubbles of diameter substantially in the range about 50 micrometers to about 100 micrometers whereby these bubbles initially rise slowly through the liquid and create a large interface area for a small rate of gas injection.

BRIEF DESCRIPTION OF THE DRAWINGS

An implementation of the invention is described by way of example with reference to the accompanying drawings, in which.

MORE DETAILED DESCRIPTION

Figure 1:
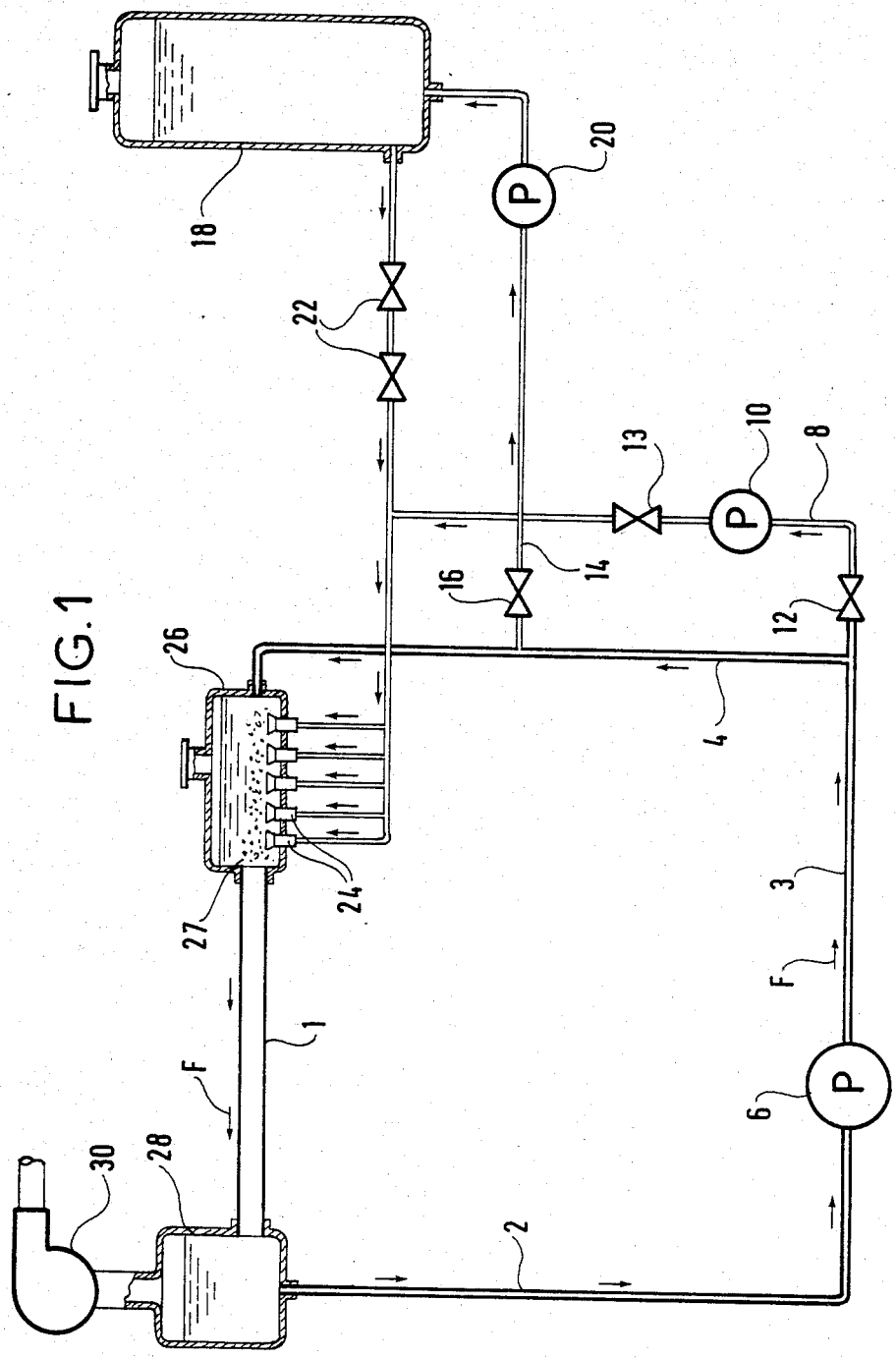
FIG. 1 is a schematic view which shows a hydraulic circuit implementing the invention.

The hydraulic circuit described by way of example is the circuit of a tunnel for hydrodynamic testing in which the water moving at speed must interact mechanically with models of hydraulic items being studied. Since these models are at a smaller scale than the hydraulic item to be constructed, the cavitation phenomena that will take place on the future full scale item can only be correctly simulated with water having a reduced concentration of dissolved air.

The water in the circuit may, for example, have an initial concentraion of dissolved air corresponding to saturation under atmospheric pressure. The concentration must be reduced by 80% before testing. Such degassing requires, for example, more than 50 hours for a volume of 270 cubic meters ($m^3$) of water using conventional techniques.

This circuit includes a main portion having four branches 1, 2, 3, 4 with the branch 1 at the top. A high power pump 6 is for use during testing. It is disposed in the bottom branch 3, at 15 meters (m) below the branch 1. The direction of water circulation is shown by arrows F. During degassing, the water circulates in the same direction at a low flow rate, eg. 0.5 $m^3/s$. This water constitutes the liquid to be degassed, and the unwanted gas is air.

In accordance with the invention, the degassing method applicable to a liquid in a closed circuit comprises the following operations:

Taking a fraction of the said liquid flow, said fraction being called the "fraction for injection". This fraction is 20 liters per second (l/s) in this case. It flows through pipework 8;

Pressurizing the "fraction for injection" to an injection pressure greater than twice the degassing pressure. This prussurization takes place here at 3 to 4 bars absolute, by virtue of a pump 10 disposed between valves 12 and 13, while the degassing pressure in the branch 1 is 0.1 of a bar;

Taking a fraction 14 of the said liquid flow, said fraction being called the "fration for engassing" and circulating through pipework 14 and a valve 16;

Engassing the said "engassing fraction", which operation takes place in an engassing enclosure 18 which is fed with the said unwanted gas and which is subjected to an engassing pressure that is higher than the injection pressure. This operation is provided to dissolve the gas in the liquid to a concentration which is greater than twice the initial concentration, and to transform this fraction into a "superengassed" fraction. More particularly, the pressure here is 7 bars and is created by a pump 20. The concentration obtained is thus 7 times greater than the concentration which would be obtained by saturating the liquid with the gas at atmospheric pressure;

Progressive and adjustable relaxing of this superengassed fraction to mix it in adjustable proportions with the "injection fraction" and thus to supply an injection mixture having a substantially constant injection concentration of the said unwanted gas. This relaxation to the injection pressure is provided here by a succession of valves 22. The relaxation must be progressive in order avoid premature formation of bubbles in the liquid which is thus supersaturated with gas;

Injecting the microbubbles. This operation takes place with the aid of five injectors 24 which are described below and which cause the mixture to penetrate via injection holes into an injection enclosure 26 placed in series with the upstream end of the branch 1. An observation port (not shown) enables the clouds 27 of injected microbubbles to be observed. The valves 22 are adjusted as a function of the site of these clouds; and Reduced pressure mass exchange. This operation takes place at the downstream end of the branch 1 in a separation enclosure 28 having a free surface area of a few m². The gaseous medium above this surface is constituted by a mixture of air and water vapor. It is aspirated by a pump 30 which maintains the degassing pressure.

Figure 2:
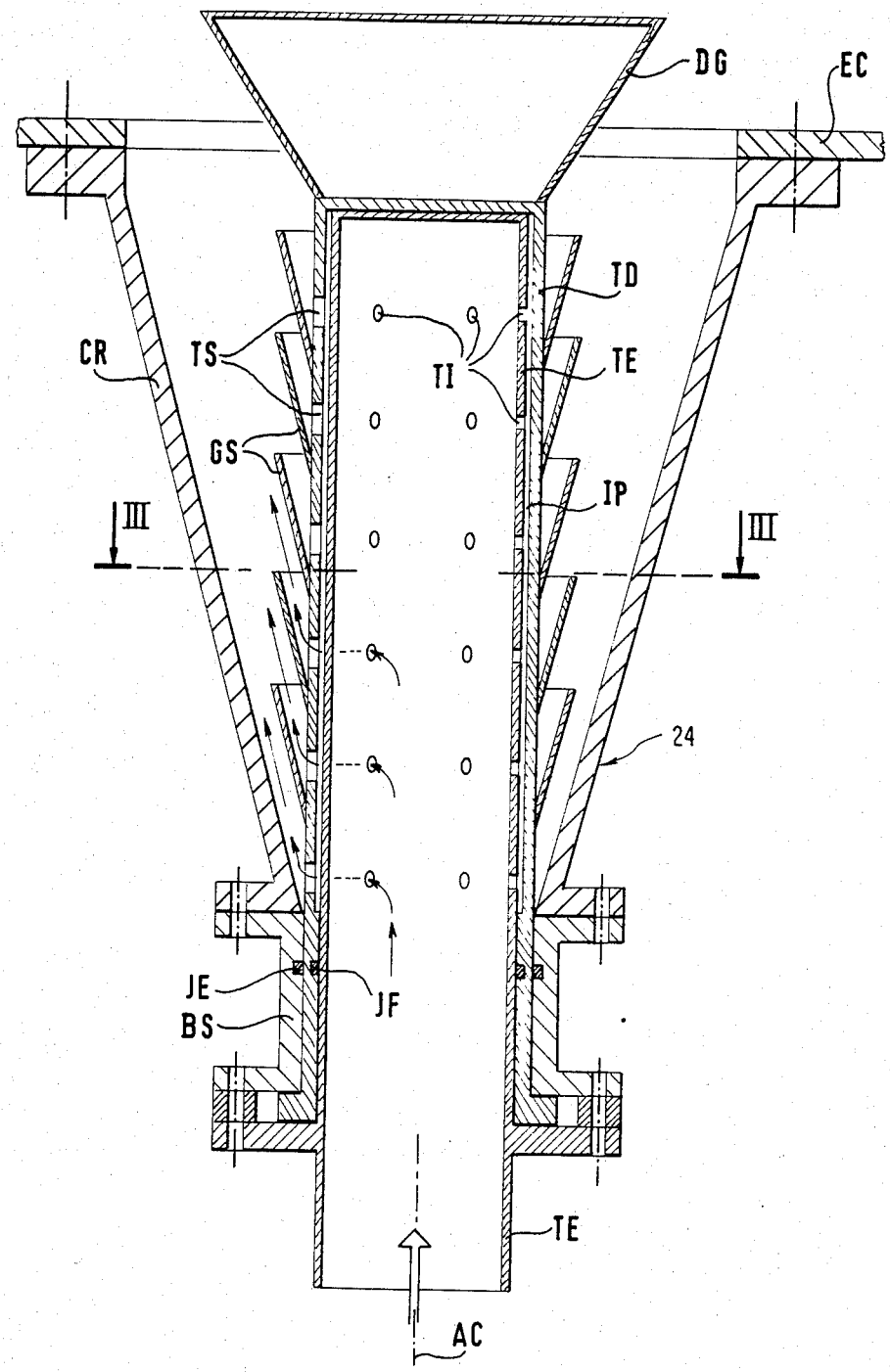
FIG. 2 is a section view of a microbubble injector in this circuit, with the section being taken on two planes passing through the central axis of the injector along a line II—II in FIG. 3.

The transit time of the water through the injection and degassing enclosures is, for example, 20 s in this case. It must not be accompanied by a large loss of head According to FIGS. 2 and 3, each injector 24 comprises a large number, eg. 36, injection holes TI, to enable a large number of microbubbles to be injected per second.

More precisely it comprises:

an inlet tube TE receiving a liquid injection mixture under pressure and in the form of a circular cylinder about an axis AC, the cylindrical side wall of this tube constituting an injection wall and being pierced by a plurality of injection holes TI spread out over its surface; and a deflector tube TD coaxially surrounding the inlet tube and leaving an annular passage gap IP.

This deflector tube constitutes a deflector wall in front of each of the injection holes TI. It is pierced by a plurality of outlet holes TS spread out over its surface to escape from the annular passage gap. The outlet holes are situated at a distance from the injection holes. As a whole they provide the liquid with an outlet passage area which is a multiple (at least twice) the passage area provided by the annular passage gap around the injection holes. For each outlet hole, the outlet passage area in question is naturally the smaller of two passge areas: one of which is the area in the annular gap around the edges of the hole; and the other is the area of the hole itself. The purpose of this arrangement is to ensure that the passage area which limits the rate at which liquid is injected is to be found around the injection holes and not in the vicinity of the outlet holes.

The thickness of the said passge gap is preferably less than one tenth of the diameter of the injection holes TI and the set of outlet holes preferably has a total outlet area greater than that provided by the set of injection holes.

It is further preferable for the injection holes TI to have individual diameters in the range 2 mm to 10 mm, eg 3 mm, and for them to be regularly distributed over at least a zone of the inlet tube TE, eg. over the entire area thereof. The passage gap between the inlet tube TE and the deflector tube TD should have a substantially constant width in the range 0.1 mm to 0.5 mm, eg. 0.15 mm.

These choices result from the fact that the vacuum ratio, ie. the ratio of the total volume of the bubbles to the volume of the liquid, increases with decreasing passage gap IP and decreasing injection hole diameter, but that a gap which is too narrow or holes which are too small are too likely to be obstructed.

The outlet holes TS are regularly distributed over the entire zone of the deflector tube facing the injection holes, and may, for example, be interspersed between the injection holes over the entire side wall area of the tubes TE and TS.

The injection holes are distributed, for example, in successive stages at regular intervals along the central axis AC and are distributed at each stage at regular angular intervals all around the axis, and the outlet holes are likewise distributed in stages within which they form an angular succession at the same interval as the injection holes, but offset therefrom by half the interval. The axial intervals between two successive stages are the same with the stages of outlet holes being in coincidence with the stages of injection holes (as shown), or else offset by half the axial interval. The outlet holes have a diameter of about 10 mm.

An outlet guide GS is preferably fixed on the deflector tube TD opposite each outlet hole TS to deflect the flow of microbubble-containing liquid therefrom along a direction close to the direction of the central axis AC.

More particularly, an outlet guide GS is formed at each stage of outlet holes by a frusto-conical wall which is symmetrical about the axis and which has its small circular base fixed to the outlet tube at a distance from the outlet holes of a stage, with the frusto-conical outlet guides of the successive stage all having substantially the same half angle at the apex of less than 45°. This half angle at the apex may be about 20° for example.

Figure 3:
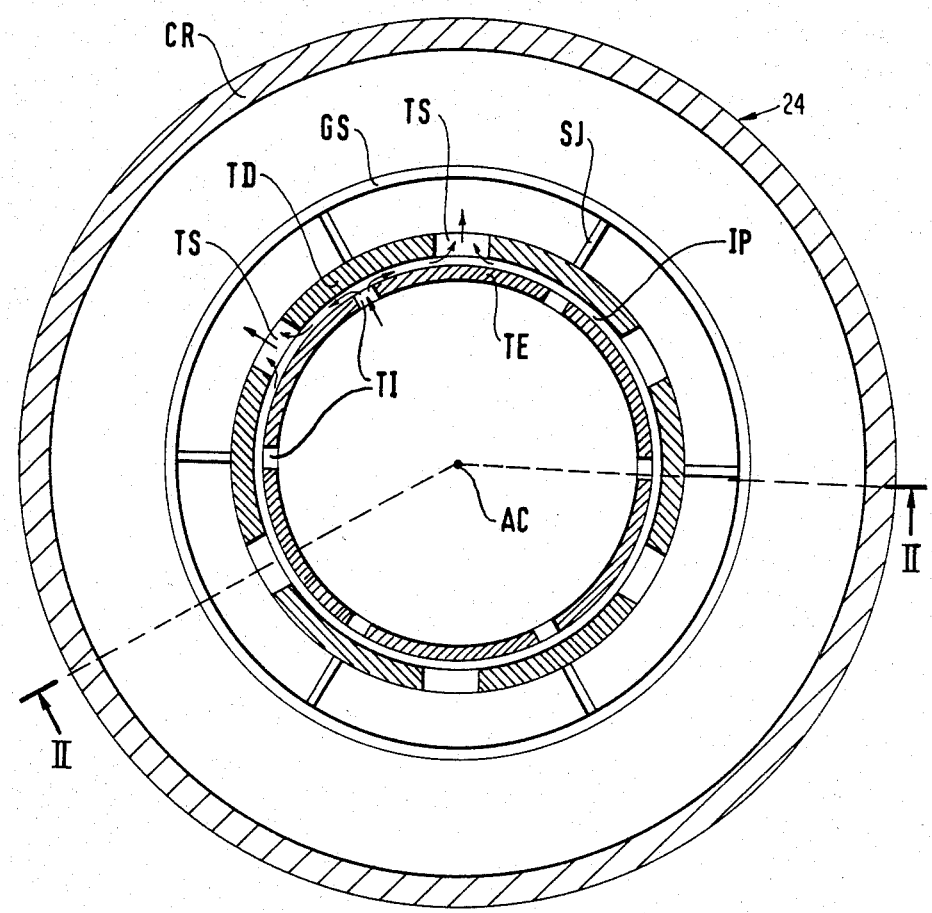
FIG. 3 is a cross section view of the FIG. 2 injector on a plane perpendicular to the axis of the injector on a line III—III of FIG. 2.

FIG. 3 also shows jet separators SJ radially interconnecting each outlet guide GS to the deflecor tube TD at angular intervals between the outlet holes TS.

The injector further includes a reception cone CR which is symmetrical about the central axis AC and which surrounds the set of outlet guides GS and having an angle at the apex which is in the same direction as and which is not greater than that of the guides for guiding the overall flow leaving the outlet holes in an average direction parallel to the central axis AC towards the enclosure EC.

The injector finally includes a general frusto-conical deflector DG which is symmetrical about the central axis AC having its small base connected to the side wall of the deflector tube TD downstream from the outlet guides GS and having a half angle at the apex in the same direction as and greater than that of the guides to distribute the flow leaving the reception cone CR into the enclosure EC.

The deflector tube TD is mounted rotably about the central axis AC relative to the inlet tube TE for cleaning the injection holes TI and the passage gap between the tube TD and the inlet tube TE. This rotation can be obtained without loss of sealing by means of two sealing rings JE and JF disposed upstream from the injection holes and the outlet holes firstly between the deflector tube TD and a fixed support BS and secondly between the deflector tube and the inlet tube TE.

The general deflector is easily used to turn the deflector tube TD.

The injector which has just been described enables a vacum ratio of 1% to be obtained with bubbles having a diameter of about 0.1 mm. It passes water at 3 l/s.

Thus, using five injectors of this type, a final concentration of dissolved air can be obtained, in about one hour and in a total volume of water of 270 m$^3$, which is equal to 20% of the initial concentration.

Generally, the total flow Qi through the injectors in m$^3$/s is a function of the total volume V in m$^3$ of water to be degassed. It is determined approximately by the equation $Qi = 4.3 \times 10 - 5\nu$. For an absolute injection pressure of 4 bars, the number of injector orifices is about $2.25 \times 10^4$ Qi.

We claim:

1. A method of degassing a liquid, the method being applicable to a liquid containing an unwanted gas in solution and serving to reduce the concentration of the gas to final concentration below its initial concentration, said method comprising the steps of:

effecting mass exchange at reduced pressure during which the liquid is to be degassed by placing said liquid in a free separation enclosure, and aspirating the gaseous medium above the liquid to reduce the pressure of the unwanted gas to a degassing value below its saturation pressure which corresponds to the desired final concentration, and maintaining said degassing pressure for the time required to obtain the desired final pressure by mass exchange through the interface between the liquid and the gas phases, injecting bubbles of said unwanted gas itself into the un-degassed liquid to thereby increase the area of the interface between the liquid and gas phases during the reduced pressure exchange operation, thereby accelerating mass exchange, the improvement wherein said step of injecting microbubbles comprising injecting microbubbles of a diameter substantially in the range of about 50 micrometers to about 100 micrometers under a condition of a small rate of gas injection whereby said bubbles initially rise slowly through the liquid and create a large interface area, wherein said method is applicable to a liquid circulating in a closed circuit and further comprises the following steps:

taking a fraction of said liquid flow, said fraction being a fraction for injection;

pressurizing said fraction to an injection pressure greater than twice the degassing pressure;

taking a fraction of said liquid flow, said fraction being a fraction for engassing;

engassing the fraction for engassing in an engassing enclosure which is supplied with said unwanted gas and which is subjected to an engassing pressure greater than the injection pressure, thereby dissolving the gas in a liquid to a concentration which is greater than twice the initial concentration; and transforming said fraction into a superengassed fraction; and progressively and adjustably relaxing the superengassed fraction to mix it in adjustable proportions with the injection fraction and thus to supply an injection mixture having a substantially constant injection concentration of said unwanted gas;

with said step of injecting bubbles into said liquid taking place through injection holes supplied with the injection mixture and leading to said liquid substantially at the degassing pressure.

2. A method according to claim 1, wherein the injection step takes place in an injection enclosure upstream from the separation enclosure.

3. A method according to claim 1, in which the said unwanted gas is air, and the said liquid is water.

* * * * *